United States Patent [19]
Toth et al.

[11] Patent Number: 5,529,567
[45] Date of Patent: Jun. 25, 1996

[54] BLOOD PROCESSING SYSTEM HAVING SPILL SENSOR WITH FAIL-SAFE CIRCUIT

[75] Inventors: Ronald E. Toth, Grayslake; William H. Cork, Lake Bluff, both of Ill.

[73] Assignee: Baxter International Inc., Deerfield, Ill.

[21] Appl. No.: 270,644

[22] Filed: Jul. 1, 1994

[51] Int. Cl.⁶ ..................................... B04B 9/10
[52] U.S. Cl. ................... 494/7; 494/10; 494/45
[58] Field of Search .................... 340/603–605; 422/72; 436/45, 177; 494/10, 12, 18, 21, 60, 7

[56] References Cited

U.S. PATENT DOCUMENTS

| | | | |
|---|---|---|---|
| 3,778,570 | 12/1973 | Shuman | 340/604 |
| 4,319,232 | 3/1982 | Westphal | 340/604 |
| 4,663,614 | 5/1987 | Rauchwerger | 340/605 |
| 4,740,777 | 4/1988 | Slocum | 340/603 |
| 4,806,252 | 2/1989 | Brown | 494/10 |
| 5,071,402 | 12/1991 | Weyant Jr. . | |
| 5,091,715 | 2/1992 | Murphy | 340/604 |
| 5,104,526 | 4/1992 | Brown et al. . | |

Primary Examiner—David Scherbel
Assistant Examiner—Terrence R. Till
Attorney, Agent, or Firm—Daniel D. Ryan; Bradford R. L. Price; Joseph B. Barrett

[57] ABSTRACT

A blood processing assembly includes a centrifuge contained within a heated housing or chamber. A fail safe spill or splash detector is located within the inner wall of the housing. The detector includes a pair of parallel electrodes separated from each other from a small gap. The circuit detects a splash or droplet of liquid which conducts current between the electrodes.

11 Claims, 4 Drawing Sheets

BLOOD PROCESSING SYSTEM HAVING SPILL SENSOR WITH FAIL-SAFE CIRCUIT

FIELD OF THE INVENTION

The invention relates to blood processing systems and apparatus. More specifically, the invention relates to blood processing apparatus such as centrifuges which are provided with improved spill sensors.

BACKGROUND OF THE INVENTION

Whole blood is separated by centrifugation into its various constituents, such as red blood cells, platelets, and plasma. Conventional blood processing methods use centrifuge equipment in association heaters that maintain the temperature of the processing system during the centrifuging process. Such systems have been provided with splash or spill detectors in the past that rely on a circuit being shorted by spilled blood to signal the existence of the spill.

SUMMARY OF THE INVENTION

The invention provides improved blood processing systems with a spill or splash detector that is fail safe in that the system is continuously monitored to ensure that the detector is operational. One aspect of the invention provides a blood processing assembly that includes a centrifuge having an enclosing housing, which may be provided with a heater and which housing contains a splash or spill detector that is provided with such fail safe characteristics by means of appropriate electronic circuits. It is an important object of the invention to provide a device that detects failure of a spill detecting system thus eliminating the need for verification of functionality by the operator.

In accordance with a further aspect of the invention, such circuits are provided using conventional and inexpensive components such as resistors or capacitors.

In accordance with a yet further related aspect of the invention, an open circuit is provided in the form of two parallel printed circuit conductors that are spaced apart a selected distance so that when a splash occurs within the confines of the housing a circuit is closed between the two parallel conductors. Such circuit is provided so that when a leak occurs, the circuit is closed, thereby triggering a message, sounding an alarm and/or stopping the centrifuge. The conductive strips form, in effect, electrodes that are insulated from each other and also from the surface on which they are mounted. Blood or other liquid from a leak in the centrifuge is thrown against the compartment wall and, thus, on the conductive strips. The blood causes a low resistance connection between the conductive strips. Thus current flows through the electrodes at a higher rate than that which flows through the fail—safe monitoring circuit, which in turn causes a message to be triggered and the machine to be stopped.

In accordance with the invention, a resistor or, alternatively, a capacitor is positioned between one end of each of the conductive strips so that a small amount of current continues to flow through the resistor or capacitor. This current flow is monitored, thus indicating that the system is functional. In the event of total failure of the system, the lack of this monitoring current is noted and an appropriate alarm or message indicating failure of the system is triggered.

Further features and advantages of the invention will become apparent from the following description, the drawings, and the claims.

DESCRIPTION OF THE PREFERRED EMBODIMENTS

Figure 1:
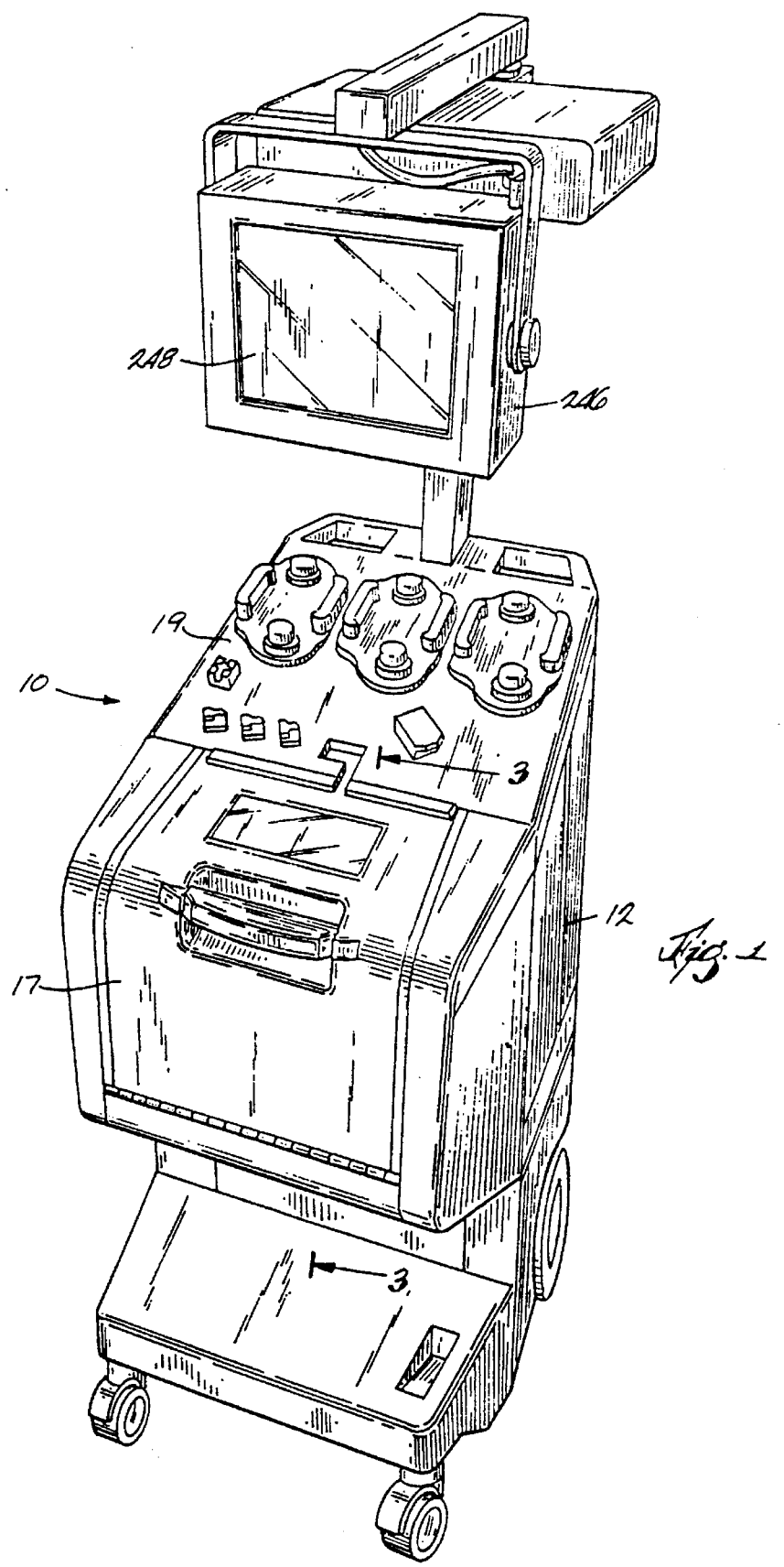
FIG. 1 is a perspective view of a centrifugal assembly that embodies the features of the invention.
Figure 2:
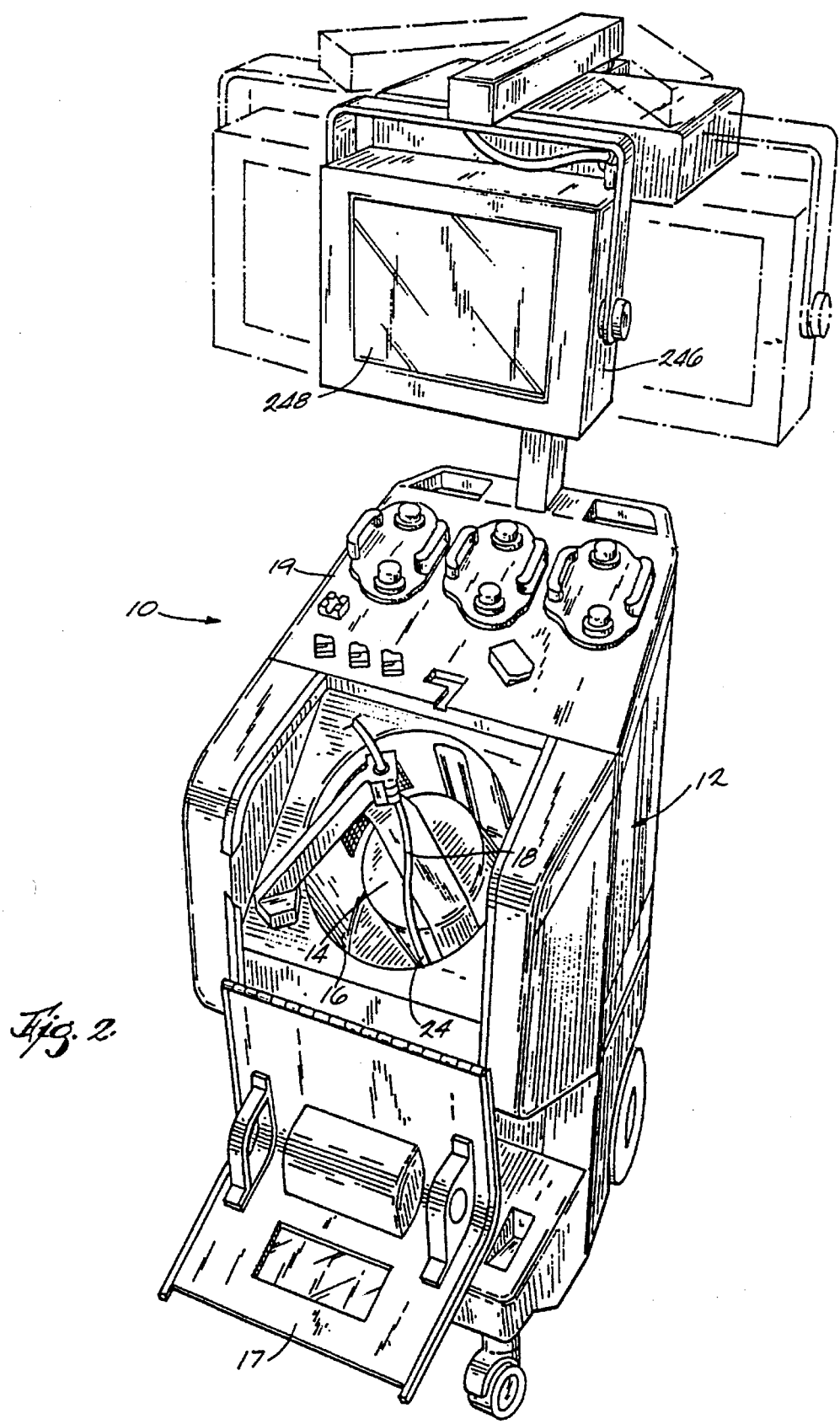
FIG. 2 is a perspective view of the assembly of FIG. 1 showing the centrifuge chamber in the open position.
Figure 3:
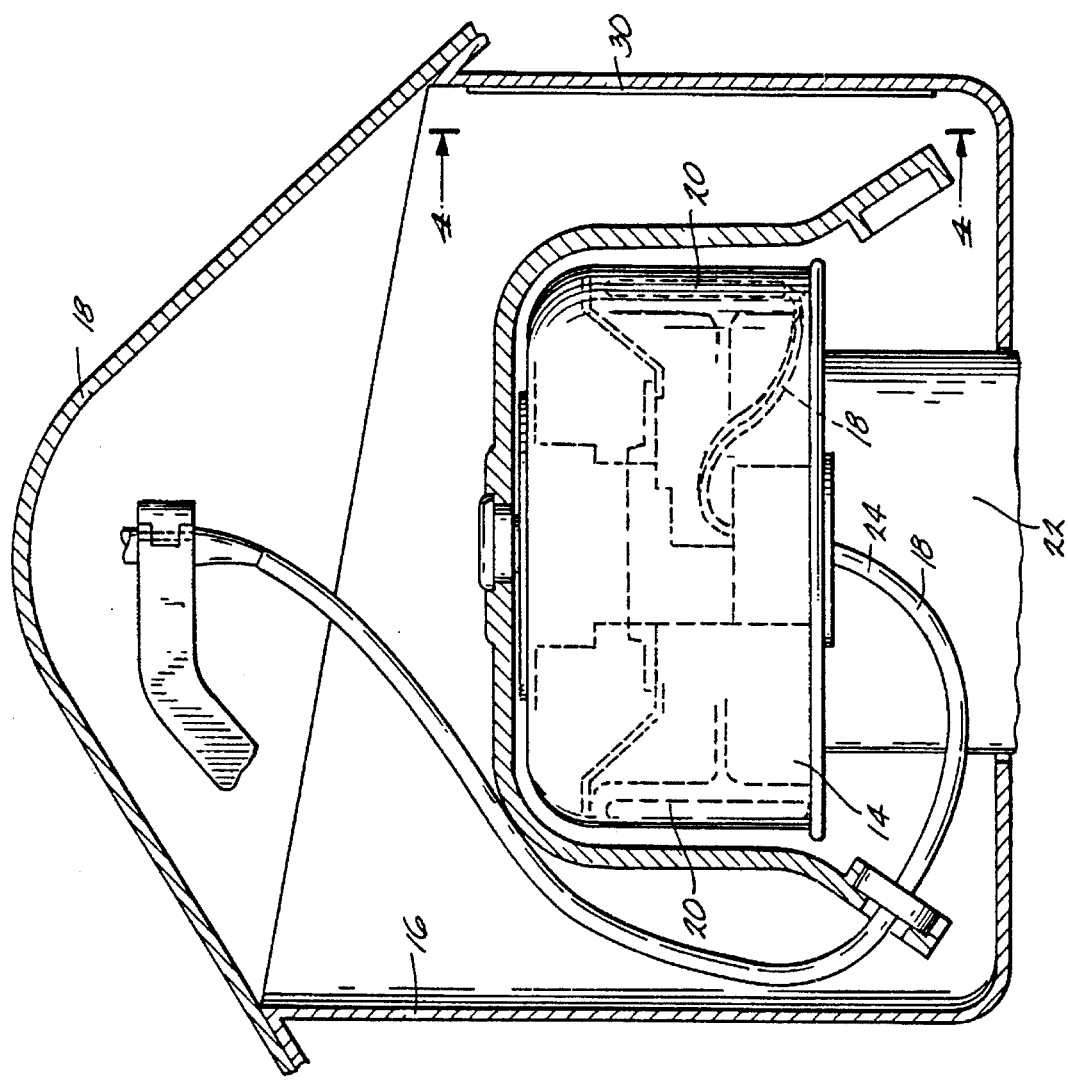
FIG. 3 is a sectional view of a centrifuge shown in FIG. 1 taken along Line 3—3 with parts broken away to show the compartment that houses the associated centrifuge.

FIGS. 1 to 3 show a centrifugal processing system 10 that embodies the features of the invention. The system 10 can be used for processing various fluids. The system 10 is particularly well suited for processing whole blood and other suspensions of biological cellular materials. Accordingly, the illustrated embodiment shows the system 10 used for this purpose.

The system 10 includes a centrifuge assembly 12 (see FIG. 1) and a fluid processing assembly (not shown) used in association with the centrifuge assembly.

The centrifuge assembly 12 is intended to be a durable equipment item capable of long term, maintenance free use. The fluid processing assembly is a single use, disposable set loaded on the centrifuge assembly 12 at time of use in accordance with known practices. The operator removes the fluid processing assembly from the centrifuge assembly 12 upon the completing the procedure and discards it.

FIG. 2 shows a centrifuge or processing chamber 14 and containment housing 16 usable in association with the assembly 12. In use, the centrifuge assembly 12 rotates the processing chamber 14 to centrifugally separate blood components. The construction of the processing chamber 14 can vary, with numerous constructions being known in the art.

The processing assembly 12 includes an array of flexible tubing that forms a fluid circuit 18. The fluid circuit 18 conveys liquids to and from the processing chamber 14.

The fluid circuit 18 includes a number of containers 20. In use, the containers 20 fit on hangers within the centrifuge assembly 12 (see FIG. 3) to dispense and receive liquids during processing. Centrifuge 14 is rotationally driven by a motor 22.

The fluid circuit 18 includes one or more in line fluid processing containers and devices, as is known in the art, in association with pump and valve stations on the centrifuge assembly 12 to direct liquid flow among the multiple liquid sources and destinations during a blood processing procedure.

A portion of the fluid circuit 18 leading from the containers 20 is bundled together to form an umbilicus 24. The umbilicus 24 links the rotating parts of the processing assembly 12 with the nonrotating, stationary part of the processing assembly 12. The umbilicus 24 links the rotating and stationary parts of the processing assembly 12 without using rotating seals.

In the illustrated and preferred embodiment, the fluid circuit 18 preconnects the processing chamber 14, the containers 20, and other fluid processing parts of the system. The assembly 12 thereby forms an integral, sterile unit.

The umbilicus 24 consolidates the multiple fluid paths leading to and from the blood separation chamber. It provides a continuous, sterile environment for fluids to pass. In construction, the umbilicus 24 is flexible enough to function in the relatively small, compact operating space the centrifuge assembly 12 provides. Still, the umbilicus 24 is durable enough to withstand the significant flexing and torsional stresses imposed by the small, compact spinning environment, where rotation rates up to about 4000 revolutions per minute (RPM) can be encountered.

The processing chamber 14 can be variously constructed. For example, it can be constructed like the double bag processing chambers shown in Cullis et al. U.S. Pat. No. 4,146,172. Specific details of the construction of the processing chamber 14 and other components of the system are not essential to an understanding of the invention and can be also be found in copending U.S. patent application Ser. No. 07/965,074, filed Oct. 22, 1992 and entitled "Enhanced Yield Blood Processing Systems and Methods Establishing Vortex Flow Conditions," which is incorporated herein by reference.

The centrifuge assembly 12 includes a processing controller 246. The controller 246 governs the operation of the centrifuge assembly 12. The processing controller 246 preferably includes an integrated input/output terminal 248 as seen in FIG. 1), which receives and display information relating to the processing procedure.

The centrifuge 14 rotates about an axis within the compartment 16. As FIG. 2 shows, unlike conventional centrifuges, the rotational axis of the centrifuge 14 is not oriented perpendicular to the horizontal support surface. Instead, the rotational axis slopes in a plane outside a vertical plane. The centrifuge 14 is supported within the compartment 16 outside the vertical plane such that its rotating components lie near the access door 17 (see FIG. 2). In this way, opening the door 17 provides direct access to the rotating components of the centrifuge 14. The sloped orientation of rotational axis allows the centrifuge 14 to be mounted in a way that conserves vertical height.

The angled relationships established between the rotational axis of the centrifuge 14 and the plane of top panel 19 make it possible to place the rotating centrifuge components for access in a zone that lies between the knees and chest of the average person using the machine. These relationships also make it possible to place the stationary functional components such as pumps, sensors, detectors, and the like for access on the panel 19 by the user within the same zone. Most preferably, the zone lies around the waist of the average person.

Statistics providing quantitative information about the location of this preferred access zone for a range of people (e.g., Large Man, Average Man/Large Woman, Average Adult, Small Man/Average Woman, etc.) are found in the Humanscale™ Series Manuals (Authors: Niels Diffrient et al., a Project of Henry Dreyfuss Associates), published by the MIT Press, Massachusetts Institute of Technology, Cambridge, Mass.

These angled relationships established among the rotating and stationary components of the centrifuge assembly 12 provide significant ergonomic benefits that facilitate access to and operation of the assembly 12.

Further details of the chamber assembly are found in copending U.S. patent application Ser. No. 07/814,403, filed Dec. 23, 1991, and entitled "Centrifuge with Separable Bowl and Spool Elements Providing Access to the Separation Chamber," which is incorporated herein by reference.

Figure 4:
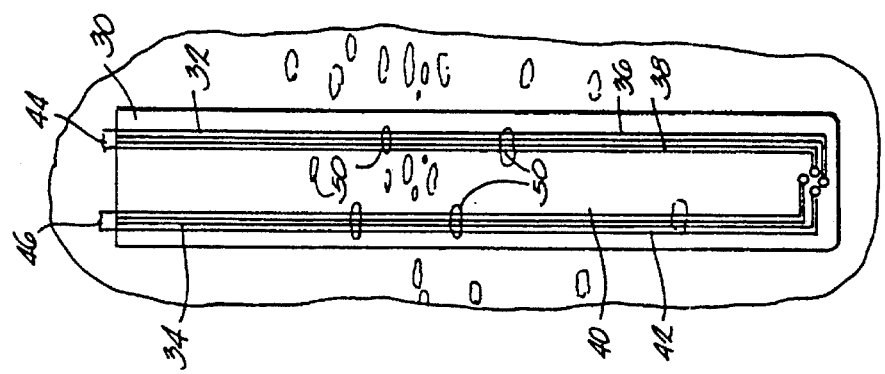
FIG. 4 is a fragmentary side elevational view taken along Line 4—4 of FIG. 3 showing a splatter detector of this invention; and, FIG. 5 is a diagrammatic view of a control circuit associated with the splatter detector.

The centrifuge 14 made and operated according to the invention provides a small, compact operating environment. The compact operating environment leads to rates of rotation greater than those typically encountered in conventional blood centrifuges. As best seen in FIGS. 3 and 4, a splatter detector assembly 30 is provided on an interior wall of housing 16. In the event that blood is leaking, for example from containers 20 or from conduits 18 or connections thereof, it is important that the centrifuge be stopped and the problem remedied before excessive amounts of blood are lost within the interior of assembly 12 and leak into the surrounding area.

In the preferred embodiment shown in the drawings, the splatter detector assembly 30 consists of two splatter detectors 32 and 34. Each of these detectors consists of a pair of parallel electrodes, 36, 38 and 40, 42, respectively. A pair of electrodes is connected by means of a high resistance resistor 44 or 46, respectively. In the preferred embodiment the electrodes 36, 38, 40 and 42 may take the form of metallic strips on a non-conductive, for example plastic base. These strips may be in the form commonly used in printed circuits.

As further seen in FIG. 4, when droplets of a liquid such as blood are deposited, on the electrodes of the spill detector, a conductive flow path can be formed between electrode conductors 36, 38 or 40, 42. This enables a greater flow of current to pass through the circuit, thus triggering a message on the screen of processor 248, as well as cutting off the power driving the rotation of centrifuge 14. This enables the operator to open and clean the interior of assembly 12 and to remedy the problem.

Figure 5:
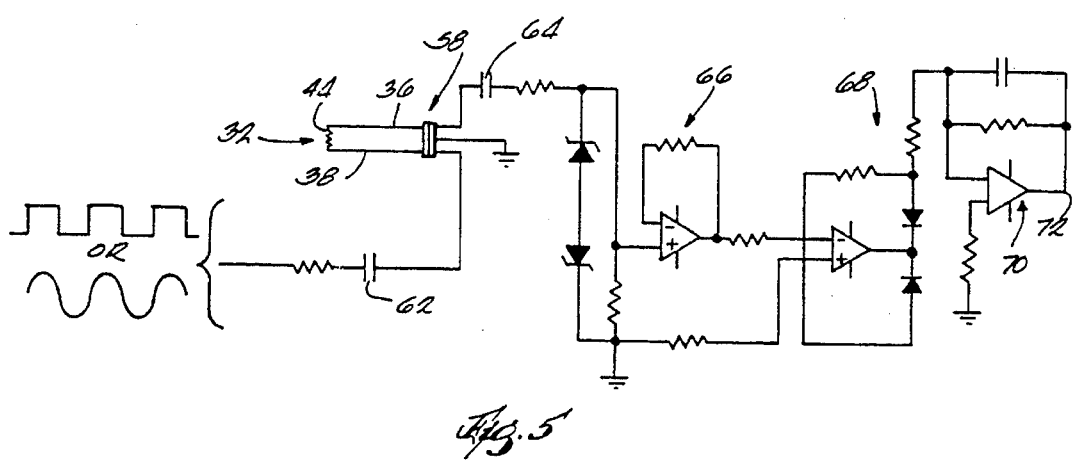

As seen in FIG. 5, each of the detectors 32 and 34 has one end of each of its electrodes 36, 38 and 40,42 connected to terminals of a connector 58. One of these terminals is connected by capacitor 62 to an AC circuit 60. Circuit 60 serves to act as a sine wave or square wave generator for the detector circuit. The other electrode is ac coupled by another capacitor 66. The circuit is connected by a buffer circuit 66 to an amplifier 68 which serves as a half-wave rectifier. A third amplifier 70 serves as a low pass filter. An analog signal output 72 connects the circuit to outside monitoring circuits contained within controller 246. The circuit, thus, enables the monitoring of the small amounts of current flow through resistors 44 and 46 which tell processing controller 246 that each of the splatter detectors is operational. Subsequently, if a droplet of fluid 50 is present across either of the pairs of electrodes 36, 38 or 40, 42, a signal of greater amplitude is transmitted by output 72. This detection of the splatter then provides an appropriate warning message on input/output terminal 248. In accordance with the preferred embodiment, controller 246 also causes the flow of power to drive motor 22 to cease thereby stopping the centrifuge.

In the event that an electrode fails or a cable becomes disconnected, the detector will immediately signal the fact that the detector is not functional because current ceases to flow through resistor or capacitor 44. Thus operator involvement is not required for monitoring whether the detector is functioning. The invention thus provides a system that is continuously self monitoring.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

What is claimed is:

1. A blood processing assembly comprising
a centrifuge for separating blood,
a chamber having an interior for housing the centrifuge,
a controller coupled to the centrifuge,
a spill sensing element in the chamber for sensing the presence of liquid droplets within the interior of the chamber including a spill indicating circuit coupled to the controller comprising at least one pair of electrodes separated to define a space between the electrodes, the spill indicating circuit being electrically closed by deposit of liquid droplets on the electrodes, thereby indicating a liquid spill to the controller,
a monitoring circuit coupled to the spill sensing element and to the controller to detect electrical function of the spill sensing element including a capacitor connecting the electrodes forming a normally electrically closed circuit between the electrodes independent of deposit of liquid droplets on the electrodes.

2. A blood processing assembly comprising
a centrifuge for separating blood,
a chamber having an interior for housing the centrifuge,
a controller coupled to the centrifuge,
a spill sensing element in the chamber for sensing the presence of liquid droplets within the interior of the chamber including a spill indicating circuit coupled to the controller comprising at least one pair of electrodes separated to define a space between the electrodes, the spill indicating circuit being electrically closed by deposit of liquid droplets on the electrodes, thereby indicating a liquid spill to the controller,
a monitoring circuit coupled to the spill sensing element and to the controller to detect electrical function of the spill sensing element including a resistor connecting the electrodes forming a normally electrically closed circuit between the electrodes independent of deposit of liquid droplets on the electrodes.

3. An assembly according to claim 1 or 2 wherein the electrodes comprise printed circuits on an electrically non-conductive backing.

4. An assembly according to claim 1 or 2 wherein the electrodes comprise spaced apart conductive wires.

5. A blood processing assembly comprising
a centrifuge for separating blood,
a chamber having an interior for housing the centrifuge,
a controller coupled to the centrifuge,
a spill sensing circuit including a sensor positioned to contact liquid droplets in the interior of the chamber and to transmit to the controller, upon contact of liquid droplets with the sensor, a spill detection signal having a first electrical characteristic, the spill sensing circuit including an element electrically coupled to the sensor to continuously transmit through the sensor to the controller, independent of contact of liquid droplets with the sensor, a functionality signal having a second electrical characteristic different than the first electrical characteristic, and
the controller generating a first output in response to the spill detection signal and generating a second output different than the first output in the absence of both the spill detection signal and the functionality signal.

6. A blood processing assembly comprising
a centrifuge for separating blood,
a chamber having an interior for housing the centrifuge,
a motor for causing the centrifuge to rotate,
a controller coupled to the motor,
a spill sensing circuit including a sensor positioned to contact liquid droplets in the interior of the chamber and to transmit to the controller, upon contact of liquid droplets with the sensor, a spill detection signal having a first electrical characteristic, the spill sensing circuit including an electrical element electrically coupled to the sensor to continuously transmit through the sensor to the controller, independent of contact of liquid droplets with the sensor, a functionality signal having a second electrical characteristic different than the first electrical characteristic, and
the controllers generating a first output causing the motor to stop rotation of the centrifuge in response to the spill detection signal and generating a second output in the absence of both the spill detection signal and the functionality signal.

7. An assembly according to claim 5 or 6 wherein the sensor comprises at least one pair of electrodes separated to define a space between the electrodes, the electrodes forming an electrically closed circuit through the space in response to contact of liquid droplets with the electrodes.

8. An assembly according to claim 7 wherein the electrodes comprise printed circuits on an electrically non-conductive backing.

9. An assembly according to claim 7 wherein the electrodes comprise spaced apart conductive wires.

10. An assembly according to claim 7 wherein the electrical element of the spill sensing circuit includes a resistor connecting the electrodes forming a normally electrically closed circuit between the electrodes independent of contact of liquid droplets with the electrodes.

11. An assembly according to claim 7 wherein the electrical element of the spill sensing circuit includes a capacitor connecting the electrodes forming a normally electrically closed circuit between the electrodes independent of contact of liquid droplets with the electrodes.

* * * * *

UNITED STATES PATENT AND TRADEMARK OFFICE
CERTIFICATE OF CORRECTION

PATENT NO.   :   5,529,567
DATED        :   June 25, 1996
INVENTOR(S)  :   Toth et al.

It is certified that error appears in the above-identified patent and that said Letters Patent is hereby corrected as shown below:

Column 2, Line 35    Before "completing" delete "the"

Column 6, Line 27    "controllers" should read --- controller ---

Signed and Sealed this

Eleventh Day of February, 1997

Attest:

Attesting Officer

BRUCE LEHMAN

Commissioner of Patents and Trademarks